United States Patent
Woodruff et al.

(10) Patent No.: US 10,315,379 B2
(45) Date of Patent: Jun. 11, 2019

(54) WRAPPABLE ABRASION RESISTANT, REFLECTIVE THERMAL PROTECTIVE TEXTILE SLEEVE AND METHOD OF CONSTRUCTION THEREOF

(71) Applicant: Federal-Mogul Powertrain, Inc., Southfield, MI (US)

(72) Inventors: Alexa A. Woodruff, Bryn Mawr, PA (US); David Zimmerman, West Chester, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 98 days.

(21) Appl. No.: 14/801,175

(22) Filed: Jul. 16, 2015

(65) Prior Publication Data

US 2016/0016376 A1    Jan. 21, 2016

Related U.S. Application Data

(60) Provisional application No. 62/025,339, filed on Jul. 16, 2014.

(51) Int. Cl.
  *B32B 5/26*    (2006.01)
  *B32B 5/02*    (2006.01)
  (Continued)

(52) U.S. Cl.
  CPC .............. *B32B 5/024* (2013.01); *B32B 3/04* (2013.01); *B32B 5/26* (2013.01); *B32B 7/12* (2013.01); *B32B 15/04* (2013.01); *B32B 15/14* (2013.01); *B32B 37/144* (2013.01); *D03D 1/0035* (2013.01); *D03D 15/00* (2013.01);
  (Continued)

(58) Field of Classification Search
  CPC .................................... B32B 5/02; B32B 5/26
  See application file for complete search history.

(56) References Cited

U.S. PATENT DOCUMENTS

| | | | |
|---|---|---|---|
| 5,617,900 | A | 4/1997 | Weil |
| 2003/0024850 | A1 | 2/2003 | Synder |

(Continued)

FOREIGN PATENT DOCUMENTS

| | | | |
|---|---|---|---|
| CN | 1678449 A | | 10/2005 |
| CN | 101945755 B | | 8/2013 |

(Continued)

OTHER PUBLICATIONS

International Search Report, dated Oct. 2, 2015 (PCT/US2015/040730).

*Primary Examiner* — Andrew T Piziali
(74) *Attorney, Agent, or Firm* — Robert L. Stearns; Dickinson Wright, PLLC

(57) ABSTRACT

A wrappable textile sleeve and method of construction thereof is provided. The sleeve includes a woven wall having opposite inner and outer edges extending in a lengthwise direction along a central longitudinal axis of the sleeve between opposite ends. The opposite inner and outer edges are wrappable into overlapping relation with one another to form an inner tubular cavity. The wall has an innermost woven layer and an outermost woven layer woven in attached relation with one another at one of the opposite inner and outer edges. A reflective layer is sandwiched between the innermost woven layer and the outermost woven layer, such that the outermost woven layer protects the underlying reflective layer against abrasion.

12 Claims, 3 Drawing Sheets

(51) Int. Cl.
*B32B 15/14* (2006.01)
*B32B 3/04* (2006.01)
*B32B 37/14* (2006.01)
*D03D 1/00* (2006.01)
*D03D 15/00* (2006.01)
*B32B 7/12* (2006.01)
*B32B 15/04* (2006.01)

(52) U.S. Cl.
CPC ........... *B32B 2262/0253* (2013.01); *B32B 2262/0269* (2013.01); *B32B 2262/0276* (2013.01); *B32B 2262/105* (2013.01); *B32B 2305/188* (2013.01); *B32B 2307/304* (2013.01); *B32B 2307/416* (2013.01); *B32B 2307/554* (2013.01); *B32B 2307/584* (2013.01); *D10B 2401/041* (2013.01)

(56) References Cited

U.S. PATENT DOCUMENTS

| | | |
|---|---|---|
| 2006/0213234 A1 | 9/2006 | Gladfelter et al. |
| 2009/0209155 A1 | 8/2009 | Goulet |
| 2011/0107621 A1 | 5/2011 | Mordecai et al. |
| 2012/0260396 A1 | 10/2012 | Mordecai |
| 2013/0306186 A1 | 11/2013 | Goulet |
| 2014/0090739 A1 | 4/2014 | Harris et al. |

FOREIGN PATENT DOCUMENTS

| | | |
|---|---|---|
| WO | WO 97/29316 | 8/1997 |
| WO | 9732067 A1 | 9/1997 |
| WO | 2009089238 A2 | 7/2009 |
| WO | 2009152293 A2 | 12/2009 |

WRAPPABLE ABRASION RESISTANT, REFLECTIVE THERMAL PROTECTIVE TEXTILE SLEEVE AND METHOD OF CONSTRUCTION THEREOF

CROSS-REFERENCE TO RELATED APPLICATIONS

This application claims the benefit of U.S. Provisional Application Ser. No. 62/025,339, filed Jul. 16, 2014, which is incorporated herein by reference in its entirety.

BACKGROUND OF THE INVENTION

1. Field of the Invention

This invention relates generally to textile sleeves of the general type used to cover wire harnesses, tubing, pipes, hoses and similar elongate structures in automotive, aerospace and other applications to protect them against thermal affects and abrasion, and more particularly to wrappable textile sleeves having opposite edges wrapped into overlapping relation with one another to protect such items and to their method of construction.

2. Related Art

Wrappable textile sleeve are known for providing thermal protection to elongate members contained therein. The wrappable textile sleeves are known to include an inner insulating layer and an outermost reflective foil layer bonded to an outer surface of the inner insulating layer. Although these known sleeves are generally effective in use when in their as originally manufactured, uncompromised state, the outermost reflective foil layer, given it is openly exposed in its entirety to the environment, can become inadvertently damaged, such as by being torn by flying debris or neighboring components. If the outermost foil layer becomes damaged, the overall effectiveness of the sleeve's thermal shielding properties can become compromised, and thus, the elongate member being shielded therein can be exposed to unwanted thermal effects.

SUMMARY OF THE INVENTION

A wrappable textile sleeve that is abrasion resistant and reflective to radiant heat is provided. The sleeve includes a woven wall having opposite inner and outer edges extending in a lengthwise direction along a central longitudinal axis of the sleeve between opposite ends. The opposite inner and outer edges are wrappable into overlapping relation with one another to form an inner tubular cavity. The wall has an innermost woven layer and an outermost woven layer woven in attached relation with one another at one of the opposite inner and outer edges. A reflective layer is sandwiched between the innermost woven layer and the outermost woven layer, such that the outermost woven layer provides protection to the underlying reflective layer against abrasion, thereby maintaining the maximum capacity of the reflective layer to shield a member contained within the sleeve against exposure to external radiant heat.

In accordance with another aspect of the invention, the innermost woven layer and the outermost woven layer are detached from one another between the inner and outer edges.

In accordance with another aspect of the invention, the innermost woven layer and the outermost woven layer are detached from one another in their entirety other than at one of the inner and outer edges.

In accordance with another aspect of the invention, each of the innermost layer and the outermost layer have warp yarns extending in the lengthwise direction generally parallel to the central longitudinal axis and weft yarns extending generally transversely to the longitudinal axis between the opposite edges, the weft yarns include heat-set thermoplastic yarns imparting a bias on the wall to bring the opposite edges into overlapping relation with one another.

In accordance with another aspect of the invention, the warp yarns of the innermost layer include insulative multifilaments.

In accordance with another aspect of the invention, the warp yarns of the outermost layer include monofilaments.

In accordance with another aspect of the invention, the monofilament warp yarns in the outermost layer are transparent.

In accordance with another aspect of the invention, the reflective foil layer is bonded to one of the innermost woven layer and the outermost woven layer.

In accordance with another aspect of the invention, a method of constructing a wrappable textile sleeve is provided. The method includes weaving a wall extending in a lengthwise direction along a longitudinal axis between opposite ends. The method further includes attaching a reflective layer to the wall and folding the wall in overlapping relation with itself to form an innermost layer of the wall and an outermost layer sandwiching the reflective layer between the innermost and outermost layers.

In accordance with another aspect of the invention, the method further includes weaving the wall with warp yarns extending in the lengthwise direction generally parallel to the longitudinal axis and weft yarns extending generally transversely to the longitudinal axis between the opposite edges and heat-setting at least some of the weft yarns to impart a bias on the wall to bring the opposite edges into overlapping relation with one another.

In accordance with another aspect of the invention, the method further includes weaving the warp yarns of the innermost layer with insulative multifilaments.

In accordance with another aspect of the invention, the method further includes weaving the warp yarns of the outermost layer with monofilaments.

In accordance with another aspect of the invention, the method further includes providing the monofilament warp yarns of the outermost layer as transparent monofilaments, thereby allowing the underlying reflective layer to be seen therethrough.

In accordance with another aspect of the invention, the method further includes bonding the reflective foil layer to at least one of the innermost woven layer and the outermost woven layer.

In accordance with another aspect of the invention, the method further includes weaving the wall on a narrow fabric loom.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
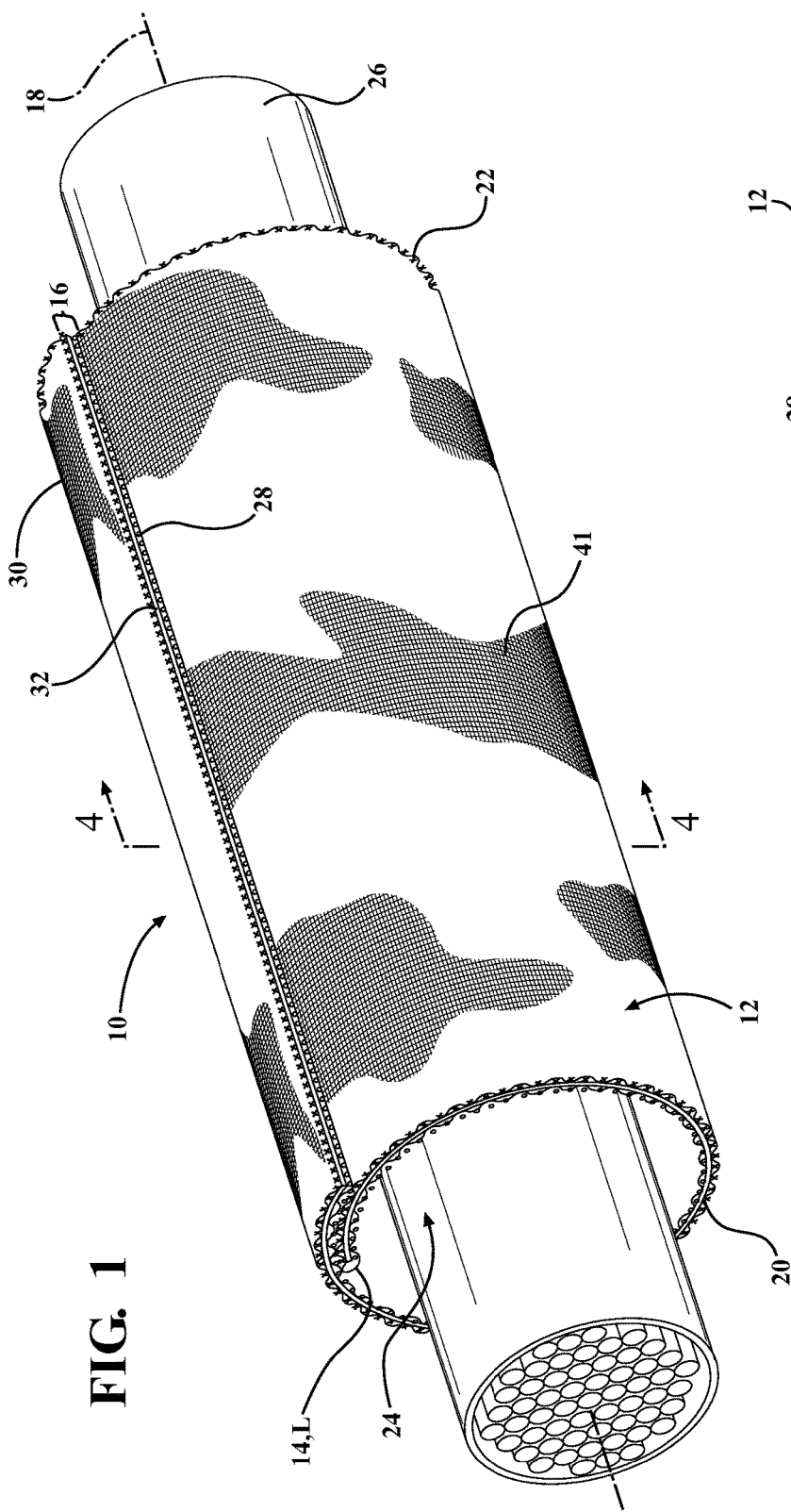
FIG. 1 is a schematic perspective view of a wrappable sleeve constructed in accordance with one presently preferred embodiment of the invention.
Figure 2:
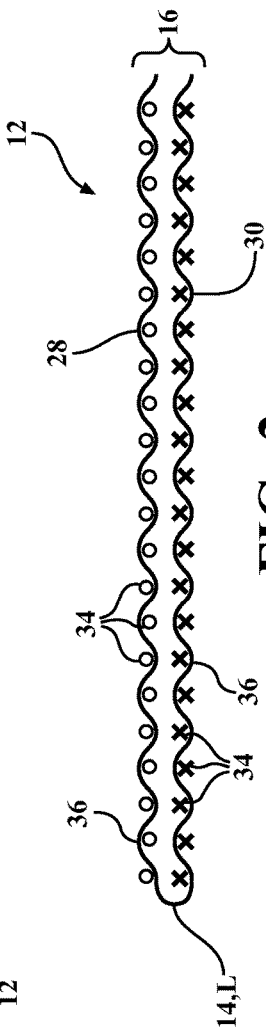
FIG. 2 is a schematic end view of a woven wall of the sleeve of FIG. 1 shown in an unwrapped, flattened configuration.

Referring in more detail to the drawings, FIG. 1 illustrates a wrappable sleeve 10 constructed in accordance with one aspect of the invention, wherein the sleeve 10 is highly resistant to abrasion, highly reflective to radiant heat, and highly insulative. The sleeve 10 includes a woven wall 12 having opposite inner and outer edges 14, 16 extending in a lengthwise direction along a central longitudinal axis 18 of the sleeve 10 between opposite ends 20, 22 of the sleeve 10. The opposite inner and outer edges 14, 16 are wrappable into overlapping relation with one another to form an inner tubular cavity 24 for receipt of an elongate member 26 to be protected therein, such as a wire harness, tube, or hose, by way of example and without limitation. The wall 12 has an innermost woven layer 28, serving primarily as a thermal protection layer, such as by being heat insulative and heat-resistant, and an outermost woven layer 30, serving primarily as an abrasion resistant layer. The innermost and outermost layers 28, 30 are preferably woven together in a single weaving process, such that the opposite layers 28, 30 are woven in attached relation with one another along a line L forming one of the opposite inner and outer edges, and shown as being connected along a straight line forming the inner edge 14. The sleeve 10 further includes a reflective layer 32, such as any suitable reflective metal foil, e.g. aluminum, stainless steel, copper, or tin, sandwiched between the innermost woven layer 28 and the outermost woven layer 30, such that the innermost and outermost layers 28, 30 form overlapping layers on opposite sides of the intermediate reflective layer 32. As such, the reflective layer 32 is physically protected along both sides from abrasion, thereby acting to protect the reflective layer 32 against inadvertent damage, such as may occur during storage, shipping, or while in use, and further acts to prolong the use life of the reflective layer 32, thereby prolonging the useful life of the sleeve 10 and the contents 26 contained therein.

The woven sleeve 10 includes yarns extending in a lengthwise direction generally parallel to the central longitudinal axis 18 between the opposite ends 20, 22, which are referred to hereafter as warp yarns 34, and yarns extending in a crosswise direction generally transversely to the central longitudinal axis 18 between the opposite edges 14, 16, which are referred to hereafter as weft or fill yarns 36.

Figure 4:
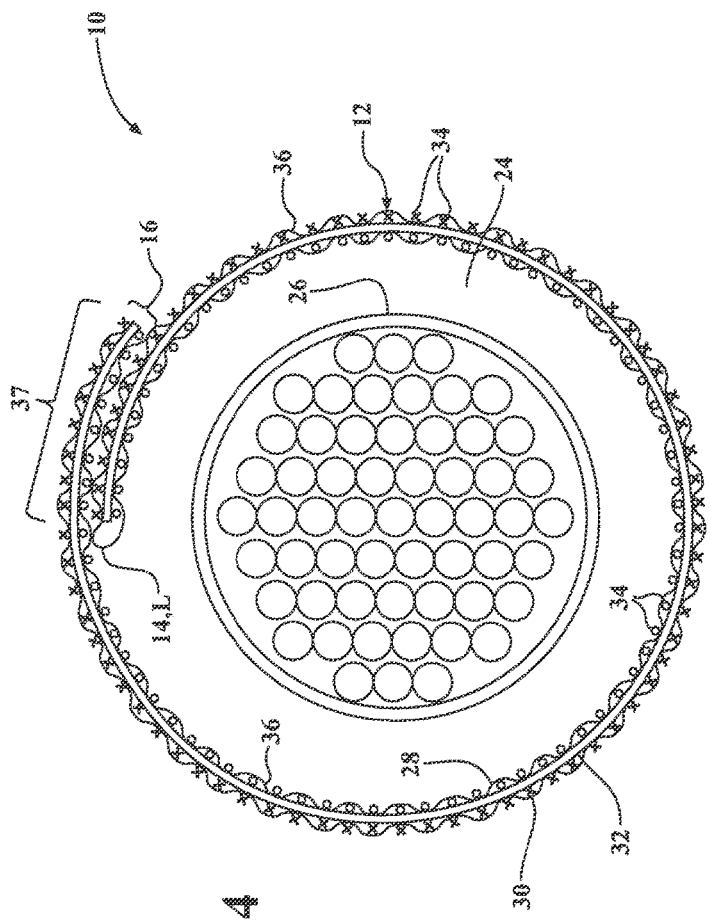
FIG. 4 is a schematic cross-sectional view taken generally along the line 4-4 of FIG. 1.

The warp yarns 34 woven in the insulative innermost layer 28 are provided as multifilaments (designated by "o") of heat insulative and/or heat-resistant material, such as multifilaments of fiberglass, silica, ceramic, basalt, aramid or carbon, having a denier between about 1000-5000, by way of example and without limitation. The weft yarns 36 woven in the insulative innermost layer 28 can also be provided, at least in part, or entirely from the aforementioned multifilaments. However, if constructing the sleeve 10 to be a self-wrapping sleeve, at least some or all of the weft yarns 36 of the innermost layer 28 can be provided as a heat-shapeable or heat-settable thermoplastic yarn, such as yarns of organic polymeric material, which are well known per se in the art, and which enable the manufacturer of the sleeve to heat-set such weft yarns 36 while in a curved, wrapped shape, wherein the heat-set biases the wall 12 of the sleeve 10 to maintain a self-curled closed tubular condition, as illustrated best in FIG. 4, such that the opposite edges 14, 16 overlap one another over an overlapped region 37 absent some externally applied force pulling the edges 14, 16 away from one another. Such heat-shapeable yarns may be monofilament yarns having a diameter between about 0.10-0.40 mm, and may be made of known suitable polymeric materials such as, for example, polyphenylene sulfide (PPS) or polyethyleneterephthalate (PET), by way of example and without limitation.

The warp and weft yarns 34, 36 woven in the abrasion resistant outermost layer 30 are provided as monofilaments (designated by "x") of abrasion resistant material, such as monofilaments of polypropylene (PP), polyphenylene sulfide (PPS) or polyethyleneterephthalate (PET) having a diameter between about 0.10-0.40 mm, by way of example and without limitation. If constructing the sleeve 10 to be a self-wrapping sleeve, at least some or all of the weft yarns 36 of the outermost layer 30 can be provided as a heat-shapeable or heat-settable thermoplastic yarn, as discussed above, namely, polyphenylene sulfide (PPS) or polyethyleneterephthalate (PET), by way of example and without limitation.

The innermost and outermost layers 28, 30 are constructed in a single weaving process, and can be formed having any suitable weave pattern, such as plain, basket, or twill, by way of example and without limitation, however, regardless of the type of weave pattern selected, it is preferred that the outermost wove layer 30 be woven having a relatively low weave density, such that the weave density of the outermost layer 30 can be less than the weave density of the innermost layer 28, thereby having a relatively low picks-per-inch (weft yarns) and ends-per-inch (warp yarns) so that relatively large, generally square openings 41 are formed between the adjacent interlaced yarns 34, 36 to allow the reflective surface of the reflective layer 32 to be clearly seen through the outermost woven layer 30, thereby enhancing the reflectivity, and thus, the thermal resistance of the wall 12. To further enhance the operable reflectivity the reflective layer 32, the warp and/or weft monofilament yarns 34, 36 forming the outermost layer 30 can be provided being transparent or substantially transparent yarns, thereby exposing a maximum area of the reflective layer 32 to the surrounding environment for reflecting radiant heat.

Figure 3:
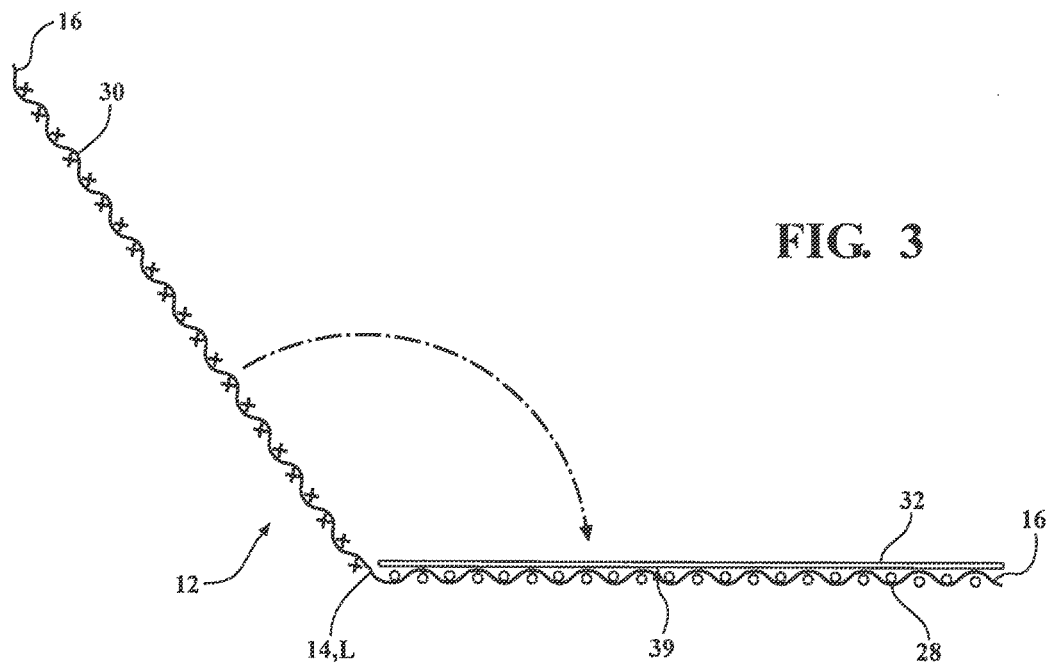
FIG. 3 is a view similar to FIG. 2 showing the woven wall in an opened configuration with a reflective layer disposed between opposite layers of the woven wall.
Figure 5:
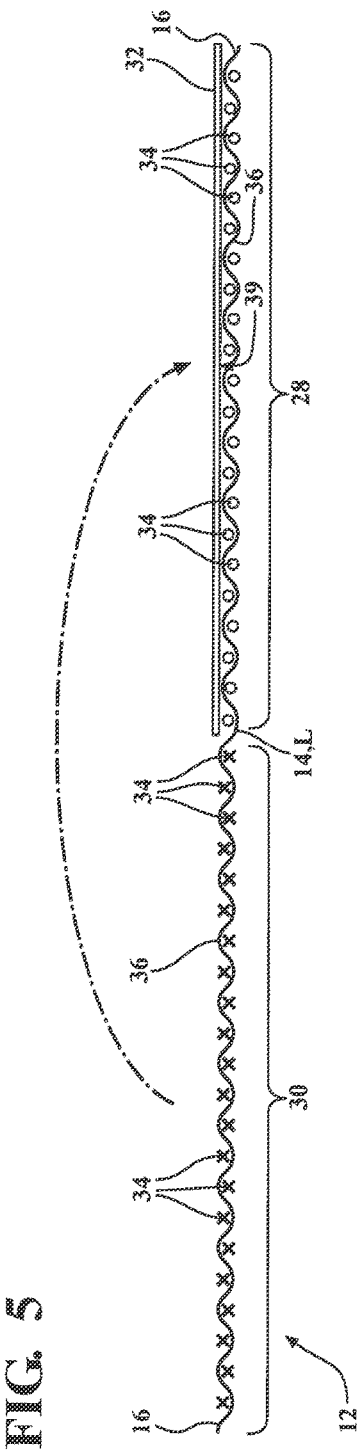
FIG. 5 is a schematic end view of a wall of the sleeve of FIG. 1 woven in accordance with another aspect of the invention, with the wall shown in an "as woven" state with a reflective layer attached to a portion of the woven wall.

To facilitate attaching the reflective layer 32 to the respective innermost or outermost layers, the reflective layer 32 can be provided having an adhesive surface 39, such that the reflective layer 32 can be simply adhered to the selected surface, shown in the different embodiments of FIGS. 3 and 5 as an inner surface of the outermost layer 30, via application of heat or pressure. It is to be recognized that the reflective layer 32 may also be laminated with a plastic film or textile scrim to improve durability during handling. The reflective foil layer 32 is preferably provided having a thickness between about 0.0003"-0.0015", by way of example and without limitation.

Figure 3A:
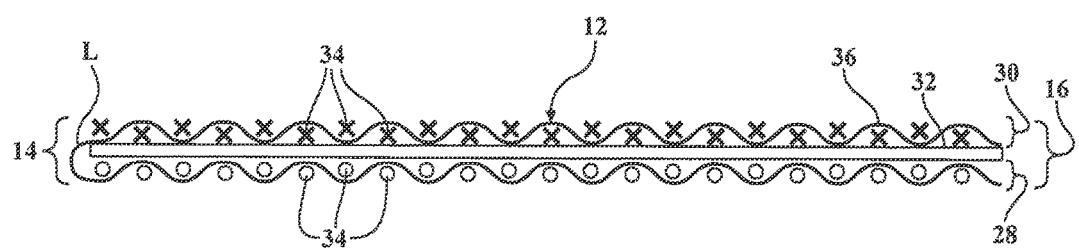
FIG. 3A is a view similar to FIG. 3 showing the wall in a closed position with the reflective layer sandwiched between opposite layers of the wall.

In the embodiment illustrated in FIGS. 3 and 3A, the wall 12 is shown as having been woven on a narrow fabric loom with dual layer construction capability. Each of the innermost and outermost layers 28, 30 are woven simultaneously in overlapping relation with one another, wherein the layers 28, 30 are interconnected with one another during the weaving process via a connection edge extending along the lengthwise extending line L, shown as being the inner edge 14 common to and interlinking both the layers 28, 30 with one another. Upon weaving the wall 12, the opposite innermost and outermost layers 28, 30 are opened, as shown in FIG. 3, and then the reflective layer 32 is attached, such as via an adhesive, by way of example and without limitation, to one of the layers, and shown as being adhered to the innermost layer 28. Bonding the reflective layer 32 to the innermost layer 28 provides a particularly good bond given the innermost layer 28 includes multifilament warp yarns 34, which provide an enhanced adhesion surface compared with the monofilaments forming the outermost layer 30. Then, upon bonding the reflective layer 32 to the innermost layer 28, the innermost and outermost layers 28, 30 are folded into their closed, generally flat orientation, as indicated by the arrow shown in FIG. 3A, thereby sandwiching the reflective layer between the overlying layers 28, 30. The sleeve 10 is now ready to be wrapped about the elongate member 26, whereupon the opposite edges 14, 16 are brought into overlapping relation with one another. Of course, as discussed above, the wall 12 can be heat-set by curling the woven wall 12 about a mandrel and heating the wall 12 sufficiently to heat-form the heat-settable weft monofilament yarns 36 into the curled configuration to automatically bias the opposite inner and outer edges 14, 16 into overlapping relation with one another.

In a method of the construction in accordance with another aspect of the invention, as illustrated in FIG. 5, the wall 12, rather weaving the innermost and outermost layers 28, 30 in overlapping relation with one another on a double flatbed weaving machine, the wall 12 can be woven on a narrow loom in a flat configuration such that the innermost and outermost layers 28, 30 are initially coplanar and generally flat with one another. The same warp and weft yarns, as discussed above, can be used to form the innermost and outermost layers 28, 30, such that the innermost layer 28 has warp insulative multifilament yarns 34 (designated by "o"), and the outermost layer 30 has warp abrasion resistant monofilament yarns 34 (designated by "x"). Then, upon weaving the flat wall 12, the reflective layer 32 is attached, as discussed above, and then, the innermost and outermost layers 28, 30 are folded in overlapping relation with one another, as indicate by the arrow in FIG. 5, to sandwich the reflective layer 32 between the innermost and outermost layers 28, 30, thereby forming the inner edge 14 common to the both layers 28, 30, and the outer edge 16. Then, as discussed above, the wall 12 can be heat-formed, if desired, to automatically bias the opposite inner and outer edges 14, 16 into overlapping relation with one another.

With the reflective layer of foil 32 being sandwiched between the innermost and outermost layers 28, 30, and with the outermost layer 30 being woven from abrasion resistant warp and weft yarns 34, 36, the reflective layer of relatively thin foil 32 is protected against being damage, such as during shipping, installation or use, and thus, is able to provide optimal protection to the elongate member 26 from unwanted exposure to radiant heat. Further, as mentioned above, with the outermost layer 30 being woven having a generally open, low density weave pattern, the area of the reflective layer 32 that is visible through the openings 41 formed between adjacent interlaced yarns of the outermost layer 30 is maximized, thereby further optimizing the operable reflective potential of the reflective intermediate layer 32. In addition, to further maximize the operable reflective potential of the reflective layer 32, the outermost layer 30 is preferably woven with transparent monofilaments. This couple with the innermost layer 28 being woven with heat-insulating, high temperature-resistant multifilaments provides the sleeve 10 with excellent thermal protection properties that ultimately inhibits radiant heat from passing through the wall 12 and reaching the inner cavity 24.

Obviously, many modifications and variations of the present invention are possible in light of the above teachings and may be practiced otherwise than as specifically described while within the scope of any ultimately allowed claims.

What is claimed is:

1. A wrappable textile sleeve, comprising:
a woven wall having opposite inner and outer edges extending in a lengthwise direction along a central longitudinal axis of the sleeve between opposite ends, said opposite inner and outer edges being wrappable into overlapping relation with one another to form an inner tubular cavity, said wall having an innermost woven layer having a first weave density and an outermost woven layer having a second weave density, said first weave density being greater than said second weave density, with said innermost and outermost woven layers being woven in attached relation with one another at one of said opposite inner and outer edges, wherein each of said innermost layer and said outermost layer have warp yarns extending in the lengthwise direction generally parallel to said central longitudinal axis and weft yarns extending generally transversely to said longitudinal axis between said opposite edges, wherein said warp yarns of said innermost layer include insulative multifilaments; and
a reflective layer sandwiched between said innermost woven layer and said outermost woven layer, wherein said reflective layer is adhered to one of said innermost woven layer and said outermost woven layer and is free from being adhered to the other of said innermost woven layer and said outermost woven layer, wherein at least some of said warp yarns and/or said weft yarns of said outermost layer are substantially transparent.

2. The wrappable textile sleeve of claim 1 wherein said innermost woven layer and said outermost woven layer are detached from one another between said inner and outer edges.

3. The wrappable textile sleeve of claim 2 wherein said innermost woven layer and said outermost woven layer are detached from one another in their entirety other than at one of said inner and outer edges.

4. The wrappable textile sleeve of claim 1 wherein said weft yarns including heat-set thermoplastic yarns imparting a bias on said wall to bring said opposite edges into their overlapping relation.

5. The wrappable textile sleeve of claim 4 wherein said warp yarns of said innermost layer are provided entirely of insulative multifilaments.

6. The wrappable textile sleeve of claim 5 wherein said warp yarns of said outermost layer are provided entirely of monofilaments.

7. The wrappable textile sleeve of claim 4 wherein said warp yarns of said outermost layer are provided entirely of monofilaments.

8. The wrappable textile sleeve of claim 1 wherein said reflective layer has a thickness between 0.0003"-0.0015".

9. A textile sleeve, comprising:
a woven wall having opposite inner and outer edges extending in a lengthwise direction along a central longitudinal axis of the sleeve between opposite ends, said opposite inner and outer edges being wrapped into overlapping relation with one another to form an inner tubular cavity, said wall having an innermost woven layer and an outermost woven layer woven in attached relation with one another with a common weft yarn at one of said opposite inner and outer edges;
said innermost and outermost woven layers have warp yarns extending in the lengthwise direction generally parallel to said central longitudinal axis and weft yarns extending generally transversely to said longitudinal axis between said opposite edges, said weft yarns including heat-set thermoplastic yarns imparting a bias on said wall to bring said opposite edges into their overlapping relation and said warp yarns of said innermost woven layer including multifilament yarns; and
a reflective layer having a thickness between 0.0003"-0.0015" sandwiched between said innermost woven layer and said outermost woven layer, wherein said reflective layer is adhered to one of said innermost woven layer and said outermost woven layer and is free from being adhered to the other of said innermost woven layer and said outermost woven layer, wherein at least some of said warp yarns and/or said weft yarns of said outermost layer are substantially transparent.

10. The wrappable textile sleeve of claim 9 wherein said warp yarns of said innermost layer are provided entirely of insulative multifilaments and said warp yarns of said outermost layer are provided entirely of monofilaments.

11. The wrappable textile sleeve of claim 10 wherein said warp yarns of said innermost layer have a first number of ends-per-inch and said warp yarns of said outermost layer have a second number of ends-per-inch, said first number of ends-per-inch being greater than said second number of ends-per-inch.

12. The wrappable textile sleeve of claim 11 wherein said weft yarns of said innermost layer have a first number of picks-per-inch and said weft yarns of said outermost layer have a second number of picks-per-inch, said first number of picks-per-inch being greater than said second number of picks-per-inch.

\* \* \* \* \*